May 30, 1939.  C. W. SPICER  2,160,445
AXLE DRIVE FOR GENERATORS
Filed Oct. 16, 1935  2 Sheets-Sheet 2
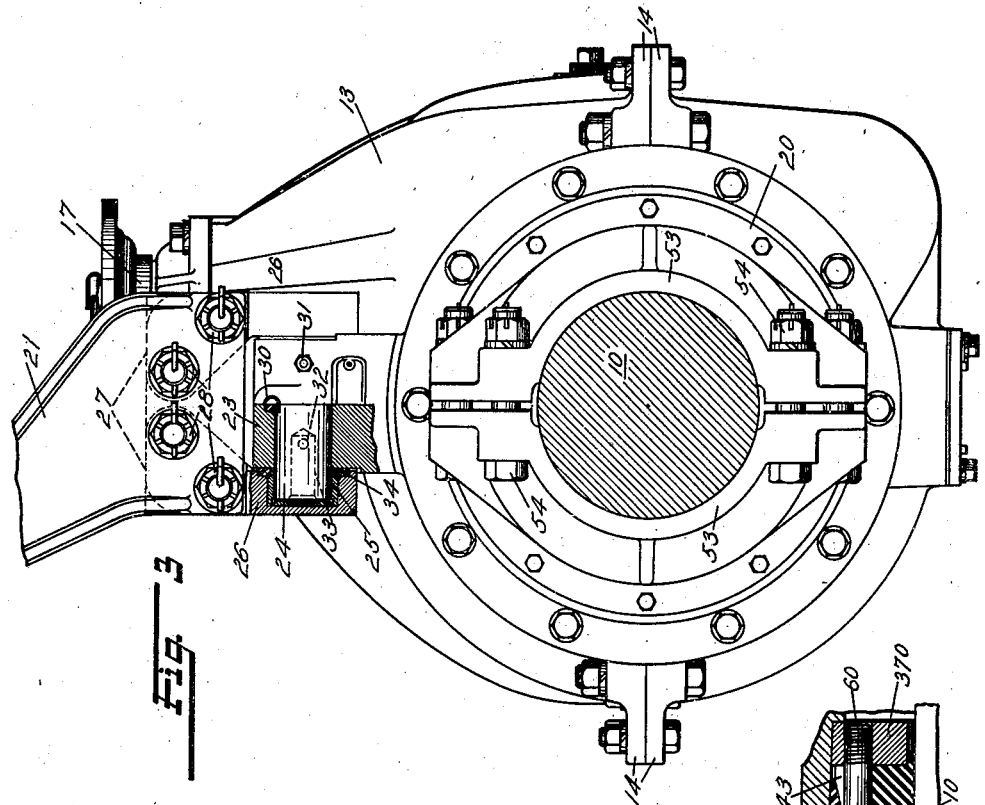
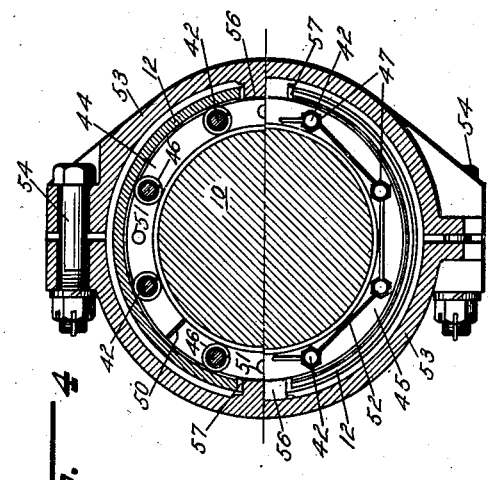
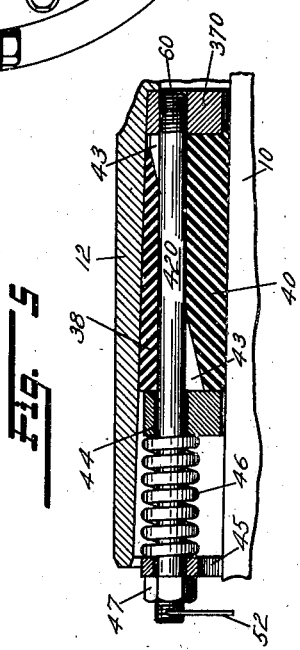
Inventor
Clarence W. Spicer
By Strauch & Hoffman
Attorneys

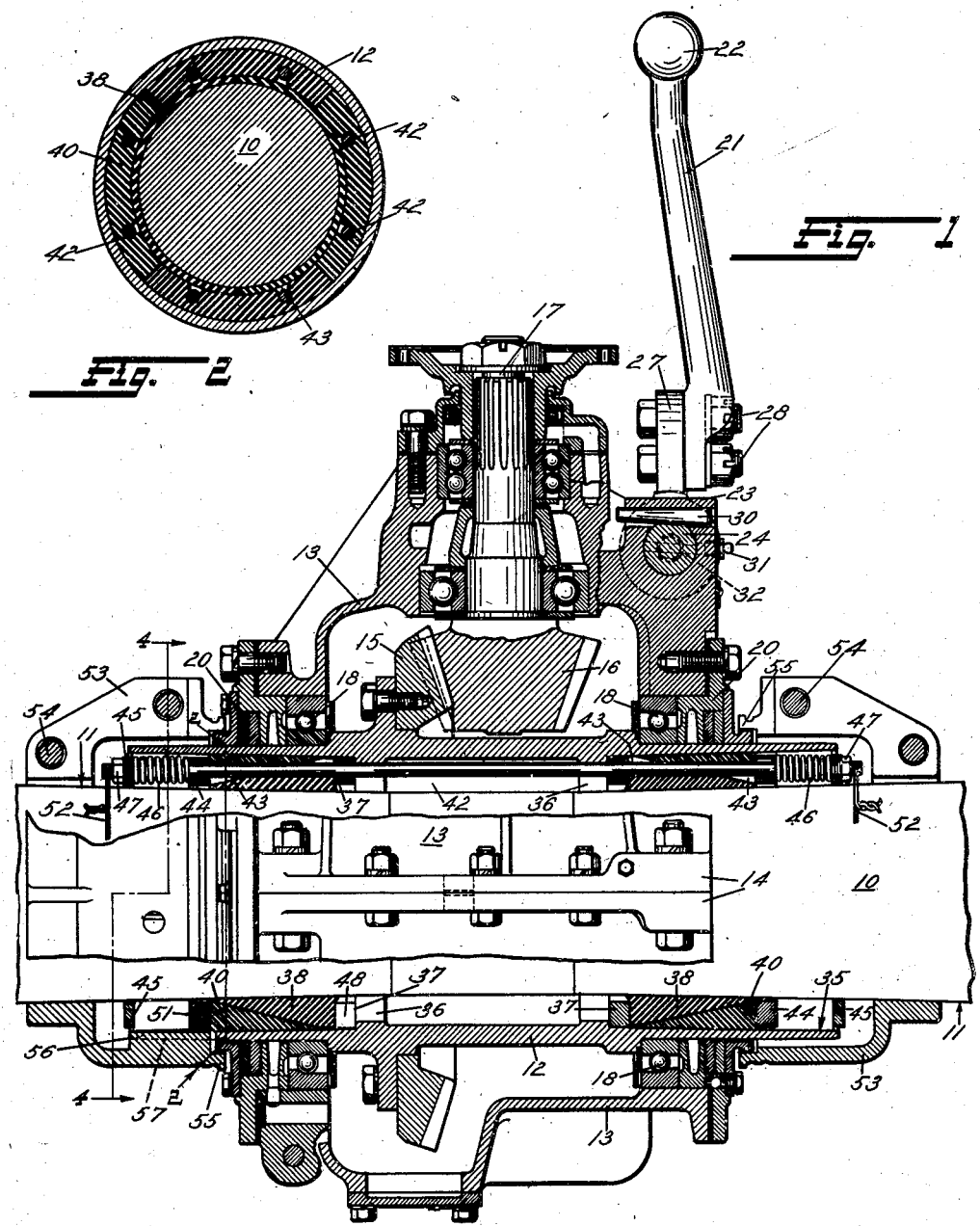

Patented May 30, 1939

2,160,445

UNITED STATES PATENT OFFICE 2,160,445

AXLE DRIVE FOR GENERATORS

Clarence W. Spicer, Toledo, Ohio, assignor to Spicer Manufacturing Corporation, Toledo, Ohio, a corporation of Virginia Application October 16, 1935, Serial No. 45,353

9 Claims. (Cl. 105—131)

The present invention relates to means for frictionally and resiliently establishing a driving connection between a pair of concentrically related surfaces such, for example, as a shaft and a surrounding sleeve; and the invention is particularly concerned with the provision of a connecting means that can be quickly assembled to establish a driving connection between an outer member or sleeve and any one of a number of inner members or shafts of approximately the same diameter.

The invention is especially concerned with generator drives of the type wherein a gear casing surrounds a rail car axle and contains gearing to be driven by rotation of the axle to thereby drive a propeller shaft and operate the generator. When rough turned, standard axles for rail cars vary as much as one-sixteenth of an inch in diameter, and forged standard axles may vary as much as one-eighth inch in diameter. Moreover, these axles are usually formed so that they taper inwardly toward the center to permit them to partake of a substantial deflection during operation to thus prevent axle failure.

It is a primary object of the present invention to devise an improved connecting means for quickly and conveniently establishing an efficient drive between an axle, regardless of its variation in diameter and taper, and a surrounding driven member or unit formed to a predetermined standard size. Even though some of the parts surrounding the axle such as the ring gear and the anti-friction bearing races may be of one-piece construction, this primary object is to be carried out without the need for accurately machining or polishing the axle and without performing any altering operation on the surrounding unit.

The foregoing object was broadly contemplated in my copending application Serial No. 529,141, filed April 10, 1931 and later issued as Patent No. 2,026,076 on December 31, 1935. In that application there was disclosed a one-piece sleeve surrounding the central part of a tapered standard axle and driven by the latter through the provision of rubber bushings jammed endwise into the spaces between the ends of the sleeve and the adjacent portions of the axle. The rubber bushings were one-piece in form except for being slit diametrically, and were forced endwise to cause a radial thickening or expansion by means of spanner nuts threaded on the ends of the sleeve and having inwardly extending flanges for transmitting force axially to the outer ends of the bushings. It has been found that such a construction affords very good results, but that there are some difficulties of assembly and in the application and maintenance of desired engagement pressures between the rubber bushings and the adjacent axle and sleeve surfaces with which they are engaged.

Accordingly, it is a specific and major object of this invention to provide improvements in the structure and operation of the invention disclosed in said copending application.

Spanner nuts sometimes warp slightly, thereby causing binding or tightening in some of the threads and making it difficult to ascertain whether the stress applied by a spanner wrench is being absorbed in the tightened threads or in the rubber of the bushing. This difficulty is removed by the present invention through the provision of bolts or rods arranged circumferentially of the bushing and having nuts which may be individually tightened to accurately apply predetermined compressive forces axially of the bushing. To facilitate assembly, and to cause an equalization of compressive forces or pressures at the opposite ends of the sleeve which surrounds the axle, the bolts or rods preferably are constructed to extend from one end of the sleeve to the other and thus pass through both of the rubber bushings.

In all constructions where rubber is utilized and permanently held in distortion or deformation, the rubber material will take a permanent set and lose some of its resiliency, and after a time only a small loosening of the parts will completely release the rubber from any tight or binding surface engagement. It is undesirable to have to make frequent adjustments, particularly in axle generator drives and like devices and accordingly it is another major object of the present invention to solve this problem by the introduction of metal spring devices which constantly urge the rubber material into deformation. This invention further contemplates the use of coil springs or the like of such pre-selected design that known or desired compressive forces can readily be applied to the rubber. That is, the spring elements can be selected so that certain visible changes in their shape, as they are placed under tension or compression, can be utilized as a calibration of the deformation in the rubber. In the preferred through-bolt arrangement for generator drives above discussed, these devices preferably take the form of coil springs surrounding at least one end of the set of through bolts and placed under compression by the nuts on the bolts.

A further object of the present invention is to provide rubber bodies which can be readily inserted to substantially fill the spaces allocated to them so that thereafter, when deforming pressure is applied, deformation takes place in the nature of a substantially pure hydraulic action—that is, there is substantially no flow of rubber during the insertion of the elements, the deformation taking place for the desired purpose after the insertion has been made. For example, in an axle generator drive, the axle may vary in diameter and may also have a taper, and rubber bushings of substantially uniform thickness will sometimes have to be distorted to a considerable extent while they are being placed in position and before the time arrives for them to be compressed endwise and thickened into surface engagement with the axle and surrounding sleeve. This not only distorts the rubber non-uniformly but creates such a resistance that it is difficult to tell just when the predetermined surface engagement has been attained for establishing a drive between the axle and the surrounding sleeve. By this invention it is proposed to provide multi-part bushings wherein the parts are concentrically related and of wedge or cone shape so that they can be placed in position to substantially fill their assigned spaces without any appreciable distortion. Thereafter any applied endwise pressure is used almost wholly to obtain surface engagement of the inner and outer surfaces of the bushing and the adjacent surfaces of the axle and sleeve.

A multi-part rubber bushing of the character above described has the further advantage that after assembly it permits an easier and more uniform flow of material than will a bushing that is not slit longitudinally. Preferably the inner wedges or rings of the concentric element which make up the rubber bushings are inserted so that their thicker ends will be adjacent the smaller part of the tapered axle, when the invention is applied to an axle generator drive, whereby the thinner or more flexible parts of the bushing will be disposed on an adjacent section of the axle that is of larger diameter. This is particularly advantageous where the bushings are made of standard construction for use on either cylindrical or tapered axles, for when thus used on a tapered axle the inner part of the bushing, which has a cylindrical inner surface can more readily be fitted to the tapered surface of the axle. The inner or thicker end of the bushing part is placed in engagement with the axle in a locus of small diameter and the thinner end of the inner bushing part can be readily flexed outwardly or flared to conform to the inner surface of a larger locus of the tapered portion of the axle.

Where multi-part bushings are utilized as above discussed, and rods or bolts are utilized to compress them endwise it is preferable to form lateral slots or grooves in the component parts of the bushing to facilitate assembly and simultaneously produce spaces in the rubber bushings which will provide recesses into which some of the rubber material may flow under deformation. This is important because rubber is incompressible and therefore has no cushioning action unless it can flow. As will be more fully pointed out, laterally formed grooves for reception of the bolts produce empty spaces at opposite ends of the bushings because of the wedge shape of the component parts thereof, and these spaces augment the cushioning action which the rubber has upon the driven unit with respect to the axle. It is, of course, an object of this invention to afford such cushioning action against shock loads, and also to cushion against sudden changes in torque load.

This invention also contemplates an improved torque rod construction for connection between the gear casing and the frame to prevent rotation of the casing. It is an object of the invention to devise a torque connection that is of long life and that requires infrequent attention, and that may be made standard for reception of torque arms of various sizes.

The foregoing and further objects of the present invention will fully appear from a study of the following detailed description when taken in connection with the accompanying drawings.

In the drawings:

Figure 1 is a sectional view taken substantially centrally and horizontally through a preferred form of the invention.

Figure 2 is a cross-sectional view taken substantially on the plane indicated by line 2—2 of Figure 1.

Figure 3 is an elevational view, with parts in section, of the device of Figure 1 as seen when looking toward the right side in Figure 1 of the drawings.

Figure 4 is a cross sectional view taken on two different planes as indicated by the irregular line 4—4 in Figure 1.

Figure 5 is a fragmentary sectional view showing a slightly modified form of the means for causing endwise compression of the rubber bushings.

With continued reference to the drawings and with particular reference for the moment to Figures 1 and 3, the illustrated embodiment of the invention comprises an axle 10 having tapered surfaces 11 surrounded by a one-piece sleeve or quill 12, in driving connection with the latter; a housing assembly 13 in which the quill is rotatably mounted; and a set of gearing disposed within the housing assembly and driven by the quill. The means for mounting the quill upon the axle and for drivingly connecting it therewith comprises the more important subject matter of the present invention and will be fully described later.

The casing proper is of two part construction, the parts having mating flanges 14 which may be bolted together to form a housing. Within this housing there is provided a bevel gear 15 in mesh with a pinion 16, the gear being formed in one piece and secured to the quill, and the pinion being carried by a power take-off shaft and coupling assembly 17 that is adapted to transmit power to a generator or the like. The ends of the quill are journaled in the casing assembly by means of anti-friction bearings 18, the races of which are of one-piece construction, and these bearings are retained and sealed by a pair of retaining and sealing assemblies 20.

For the purpose of preventing driving torque reactions from rotating the casing assembly relative to the quill, a structure is provided comprising a torque arm 21, having a ball end 22 for universal connection with the rail car truck frame and having a connection with the housing assembly through a joint designed to permit lateral or axial movement of the housing assembly while preventing rotation thereof. This joint comprises an integral extension 23 on the housing having a substantially vertical bore which receives a hardened and ground pin 24 the ends of which project beyond the extension into a pair of hardened and ground bearing bushings 25 that are press fitted into a pair of carrier cups 26. These bearing carriers or cups 26 are separable parts of a yoke construction in that they have arms 27 which extend toward each other and overlap the adjacent end of the torque arm 21, to which they are securely fastened by bolt assemblies 28. A pin 30 locks the hardened and ground pivot pin 24 against both rotational and axial movement with respect to the extension 23. The large pin 24 thus takes end thrust in addition to serving as a pivot.

The pivotal joint just described is lubricated by means of external fittings 31 which, by way of passages 32, communicate with central holes 33 that are formed in the ends of the large pin 24, lubricant in this way being provided to the end surfaces of the pin where they ride in the cup-shaped bearings 25. Except for a cork or felt washer 34 provided at the inner side of each bearing carrier to prevent access of extraneous matter, this pivotal joint is of all-metal construction and the metal parts completely seal the joint.

This joint has the further advantage that it may be made up of standard parts for use in various arrangements, it being necessary to change only the torque arm itself to obtain torque transmitting devices of various sizes or shapes.

Referring to Figures 1 and 2, it will be observed that the one-piece quill is of materially larger diameter than the axle so that regardless of taper and regardless of variations in axle diameter the quill can be positioned centrally of the axle by sliding it over one end into location. If the device is to be applied to a tapered axle, the outer ends of the quill preferably have their inner surfaces tapered as at 35 to correspond with the tapered portions of the axle which they surround, the taper terminating adjacent a pair of annular shoulders 36 on the inside of the central portion of the quill. If the axle is straight or cylindrical the inner surfaces of the quill will be similarly straight or cylindrical in shape. Against the outer side of each of these shoulders there is disposed a split annular metal ring 37 for the purpose of forming an abutment for the inner end of a rubber bushing assembly in a manner hereinafter described.

The rubber bushing assemblies just referred to are designed to substantially fill the spaces between the axle and the surrounding portions of the quill, and to be sufficiently compressed endwise to cause them to thicken or expand and establish drive transmitting engagement with said surfaces. Each bushing assembly is split longitudinally, as seen in Figure 1, into two concentric ring parts 38 and 40 respectively and for convenient assembly the inner of the two parts may be segmentally split at two points and the outer part may be split at four points as illustrated in Figure 2.

The inner and outer rings 38 and 40 preferably are preformed to shape, substantially wedge-like in cross-section, so that when they are assembled as shown in Figure 1 their inclined or coned surfaces will match each other. If desired, the bushing assemblies may be given inner and outer tapers to correspond to tapers 11 and 35 on the axle and the quill. However, if a standard product is desired for use in connection with tapered and untapered axles, the last-mentioned surfaces of the bushing parts may be made cylindrical in form, inasmuch as the rubber parts are relatively thin and flexible so that they can be placed without difficulty in an inclined space around a tapered axle portion and are made of a grade of rubber that is readily deformable to properly fill the inclined space when endwise pressure is applied to the bushings after they have been placed in position.

In each bushing assembly, as shown, the outer surface of the inner ring 38 has a series of longitudinal grooves running from end to end, and the outer ring 40 has a corresponding series of grooves in its inner surface. When the parts are assembled these grooves will be matched, as in Figure 2, to permit a series of through bolts or rods 42 to extend therethrough. In view of the fact that these openings for the rods are formed from surface grooves instead of holes, there will naturally be a small space 43 in each groove that is not filled by the bolt 42. A number of these spaces will appear at various points throughout the bushing assembly where the bolts pass through the thicker ends of the grooved rings 38 and 40. The spaces have advantages that will be later pointed out.

Although it is unnecessary that the bolts 42 take the form of elongated rods passing completely through the two bushing assemblies, such form is preferable because it facilitates assembly of the bushings from the standpoints of energy and time consumed, and moreover, when such bolts are placed under tension to compress the rubber bushing assemblies accurately in a manner about to be explained, the compressive forces on the two bushing assemblies will be equalized.

The elongated bolts 42 extend freely through holes provided in the abutment rings 37, as shown, and at each of its ends each bolt extends through a split annular clamping ring 44 and an annular reactance ring 45, and carries a compression spring 46 between said rings 44 and 45. At its extremities each bolt is threaded to receive nuts 47.

As in the case of the rings 37, the holes in the steel rings 44 and 45 are sufficiently large to permit the bolts 42 to pass therethrough with slight clearance, whereby upon tightening the nuts 47, the rings 45 will be moved inwardly toward the rubber bushings and, through springs 46, cause the compressive forces to be transmitted to the bushings by way of the rings 44. The latter rings preferably are vulcanized to the outer or large ends of the wedge-shaped segments which make up the rubber rings 40, for a purpose about to be explained.

Each of the steel rings may be of multi-segment construction if desired, but it is only necessary for facilitating assembly to split each of them at one point, as for example at 48 on ring 37 in Figure 1, and at 50 on ring 44 in Figure 4. Each ring 44 also has a series of tapped holes 51 into which bolts may be threaded for the purpose of readily withdrawing this ring and the outer rubber ring 40 that is vulcanized thereto as aforestated. Otherwise it would be very difficult to remove the rubber bushings if it were desired to dismount the entire unit or to replace the rubber bushings.

In setting up the apparatus for operation the one-piece quill 12 and all of the parts which surround the same may be pre-assembled as a unit on the bench in the shop. This pre-assembled unit is brought to the point where it is to be applied to the axle, and can be readily slid over the end of the axle to the position illustrated in Figure 1. The steel abutment rings 37 are then pushed into position endwise of the sleeve and the through bolts are preferably simultaneously, or immediately thereafter, inserted so that both members 37 will be properly positioned prior to addition of the members 38. Thereafter the segments of the inner two-part rubber rings 38 are applied to the axles with their large ends engaging rings 37 and with their longitudinal grooves receiving the ends of the through bolts. Thereupon the outer rubber rings 40 and the follower rings 44 are pushed into position, the longitudinal grooves of the rubber fitting the through bolts and the apertures of the follower rings receiving the ends of the through bolts. Due to the manner of forming the passageways through the rubber bushing for the through bolts, and due to the conicity of the matching surfaces of the two rings which form each rubber bushing, the two rings of each rubber bushing can be concentrically arranged to substantially fill the space designed to receive them, without the application of any large endwise forces that would tend to distort and deform the rubber material and that might give a mechanic the erroneous impression that he had applied sufficient compressive force to establish a driving connection between the axle and the surrounding sleeve.

With the parts located as above explained, and the springs 46, rings 45 and nuts 47 applied to the ends of the through bolts, the rubber bushings will be caused to immediately thicken radially upon screwing the nuts 47 down far enough to place the springs under compression. Each spring 46 is relatively heavy and preferably designed so that upon sufficient tightening to bring each convolution substantially into engagement with the next adjacent convolution, it will be indicated to the mechanic that the nut 47 has been tightened sufficiently to do its part in establishing proper driving engagement between the axle, the sleeve and the respective inner and outer surfaces of the rubber bushings. Moreover, in view of the fact that a series of individual tightening means is utilized the mechanic will be able to tell by the "feel" that he has drawn the nut up sufficiently to obtain a drive.

During the tightening operation the rubber will flow uniformly throughout the entire length of each bushing, due to the manner in which the bushing parts were properly pre-fitted into the space designed to receive them and also due to the multi-part construction of the bushing. As the bushings cannot expand radially to any great extent because of the restrictions imposed by the adjacent surfaces of the axle and the sleeve, some space must be provided to permit the flow of rubber if it is desired that this incompressible material be not so closely confined as to form substantially rigid and non-elastic bushings. It is desired to permit some such flow, for in addition to designing the bushings as a convenient means for readily and accurately fitting the drive unit to axles that may be tapered or may vary slightly in diameter, it is an object of this invention to utilize the bushings to act elastically in shear to transmit torque and also to cushion the axle against shock with respect to the relatively heavy drive mechanism that surrounds it. Moreover, when the axle is tapered to permit it to deflect slightly in operation to prevent failure, the rubber bodies must not be so tightly confined as to tend to prevent this flexure. Sufficient room for the desired or necessary flow is provided by the multiplicity of small spaces 43 within the grooves of the rubber bushings and by the annular clearance spaces which are afforded adjacent the rings 37 and 44 at the ends of the bushings.

To complete the assembly, locking wires 52 are passed through the ends of the through bolts to keep the nuts 47 in position, and end covers each comprising complemental parts 53, secured together by bolt and nut assemblies 54, are clamped upon the axle adjacent the ends of the quill 12. These covers serve two purposes. They close the ends of the sleeve and to this end have sealing means 55 cooperating with the sealing assemblies 20 of the housing assembly. They also serve to provide a positive drive between the axle and the quill 12 as a safety feature in case the rubber should fail or in case of the application of violent torque changes tending to stretch the rubber beyond its intended normal degree of elasticity in shear.

The positive drive just mentioned is obtained by providing in each of the end covers a pair of diametrically opposite shoulders 56, and at the corresponding end of the quill 12 providing a pair of slots 57 designed to receive the shoulders 56 (see Figures 1 and 4). The slots 57 are about one-quarter inch wider than the shoulders 56, and the covers are clamped in position on the axles so that there will be a one-eighth inch clearance on each side of each shoulder, so that normally this positive drive means is inactive and can not interfere with the proper and intended elastic functioning of the rubber.

In the modified form fragmentarily shown in Figure 5, a ring 370, corresponding to ring 37 of Figure 1, is provided with tapped holes 60, and instead of through bolts a series of short bolts or studs 420 are used and threaded into these tapped holes. The only difference, therefore, between this and the preferred form is that here the expansible packing and cushioning assembly at each end of the quill 12 is individually set up and adjusted entirely independently of that at the other end of the sleeve.

It will readily be appreciated that the form illustrated in Figure 1 may be modified to embody a single set of springs disposed at one end only of the set of through bolts.

Numerous changes and variations may be made that would be obvious to those skilled in the art. The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In an apparatus of the character described, in combination with an axle, a quill surrounding said axle to form therewith an annular space; a plurality of axially spaced resilient bushings disposed within said space, each bushing comprising a plurality of concentrically arranged members of non-uniform thickness that may be conveniently assembled in cooperative contact with each other to substantially fill those portions of the space allocated to them; and means for forcing said bushings into driving engagement with the corresponding adjacent surface portions of said axle and said quill.

2. In an apparatus of the character described, in combination with an axle, a quill surrounding said axle to form therewith an annular space; a plurality of axially spaced resilient bushings disposed within said space, each of said bushings comprising concentrically arranged rings having frusto-conical faces placed in surface engagement with each other; and means for compressing said bushings to thicken them into driving surface engagement with the axle and the quill; said compressing means including metal spring means reacting to exert substantially constant compressive force axially of the bushing assembly to cause said rings to slide axially of each other and to constantly urge said bushings into driving engagement with the axle and the quill.

3. In an apparatus of the character described, in combination with an axle, a quill surrounding said axle to form therewith an annular space; a plurality of axially spaced resilient bushings disposed within said space; said bushings having grooved passageways formed transversely thereof from end to end; and means for compressing said bushings endwise to deform them into driving engagement with the axle and the quill; said means comprising a plurality of elongated elements extending longitudinally through said passageways without completely filling them, whereby spaces are formed for the flow of rubber during deformation, and devices cooperating with said elongated elements to clamp the rubber bushings in position.

4. In sub-combination, a drive structure comprising a pair of rotatable elements designed to be coupled together for synchronous rotation, said elements having portions providing spaced substantially concentric surfaces, and means for flexibly intercoupling said portions, said means comprising a pair of rubber wedges arranged with their inclined surfaces in matched abutment and with their opposite surfaces adjacent said concentric surfaces, and means for endwise compressing of said wedges to deform them into tight frictional contact with each other and with said concentric surfaces.

5. In the apparatus defined in claim 4, said endwise compressing means including metal spring means constantly urging said rubber wedges into deformation with substantially predetermined uniform force.

6. In the apparatus defined in claim 4, said wedges having grooves extending therethrough longitudinally of their inclined surfaces, the grooves having their bottoms substantially parallel to said concentric surfaces and therefore being of non-uniform depth from end to end, and said endwise compressing means including elongated rods passing through said grooves, said rods being substantially uniform in cross section and incompletely filling portions of said grooves.

7. In an apparatus of the character described, a pair of concentric members designed to be intercoupled for synchronous rotation, the surrounding one of said members having an internal surface of sufficient diameter to form with an external surface of the surrounded member an annular clearance space, and means disposed within said clearance space to intercouple said members comprising pairs of complemental wedge-shaped elements disposed axially of the assembly and having matched contacting surfaces overlapping each other, said contacting surfaces having their inclinations reversed and running axially of the assembly, said wedge-shaped elements of each pair further having surfaces matching said external and internal surfaces of the aforementioned concentric rotatable members, and means for causing said complemental wedge-shaped elements of each pair to move axially but in opposite directions to thereby increase the radial thickness of the pair and intercouple said concentric members.

8. In an apparatus of the character described, in combination with an axle, a quill surrounding said axle, said quill and axle adapted to be coupled together for synchronous rotation, means for flexibly and drivingly intercoupling said quill and axle comprising a plurality of resilient bushings adjacent the opposite ends of said quill, each bushing comprising a plurality of resilient members having cooperating inner and outer abutting surfaces, and means for endwise compressing of said members to force them into tight frictional contact with each other on said surfaces and to thicken them radially to positively couple said quill and axle together.

9. In the apparatus defined in claim 8, said endwise compressing means including a plurality of rods extending through said members.

CLARENCE W. SPICER.